United States Patent [19]

Fontaine et al.

[11] Patent Number: 4,949,820
[45] Date of Patent: Aug. 21, 1990

[54] VEHICLE CREEP CONTROL

[75] Inventors: William G. Fontaine, 2676 S.W. 15th Street, Deerfield Beach, Fla. 33442; Vernon D. Beard, Lauderhill, Fla.

[73] Assignee: William G. Fontaine, Deerfield Beach, Fla.

[21] Appl. No.: 409,018

[22] Filed: Sep. 18, 1989

Related U.S. Application Data

[63] Continuation-in-part of Ser. No. 7/184,413, Apr. 21, 1988, abandoned.

[51] Int. Cl.$^5$ ............................................. B60K 41/20
[52] U.S. Cl. .................................. 192/1.23; 192/1.31; 192/1.34
[58] Field of Search .................... 192/1.23, 1.31, 1.32, 192/1.33, 1.34, 1.35, 1.4, 1.41, 1.42

[56] References Cited

U.S. PATENT DOCUMENTS

| | | | |
|---|---|---|---|
| 3,694,039 | 9/1972 | Kawabe et al. | 192/1.33 |
| 3,790,223 | 2/1974 | Fontaine | 303/19 |
| 3,830,330 | 8/1974 | Fontaine | 192/1.32 |
| 3,870,119 | 3/1975 | Wurst | 192/1.33 |
| 3,895,698 | 7/1975 | Fontaine | 192/1.33 |
| 4,289,219 | 9/1981 | Csurgay et al. | 192/1.21 |
| 4,389,154 | 6/1983 | Minor et al. | 414/699 |
| 4,446,950 | 5/1984 | Wise et al. | 192/1.23 |
| 4,572,319 | 2/1986 | Fontaine | 192/1.42 |

FOREIGN PATENT DOCUMENTS

| | | | |
|---|---|---|---|
| 60-8143 | 1/1985 | Japan | 192/1.31 |
| 60-60354 | 4/1985 | Japan | 192/1.23 |
| 8202176 | 7/1982 | PCT Int'l Appl. | 192/1.32 |

OTHER PUBLICATIONS

Publication: Smart Brake, The International Brake Systems, Inc., Boca Raton, Fla., Jan. 1988.

*Primary Examiner*—Rodney H. Bonck
*Attorney, Agent, or Firm*—Oltman and Flynn

[57] ABSTRACT

A vehicle creep control system which has: a speed transducer arrangement coupled to the vehicle's speedometer cable or the like, which provides an active output whenever the vehicle stops; an accelerator switch connected to the accelerator pedal, which has an active output whenever the driver's foot depresses the accelerator pedal; a latching circuit with a set input connected to the speed transducer arrangement and a clear input connected to the accelerator switch; a first delay circuit connected to the output of the latching circuit, such that when the latching circuit is set due to the vehicle slowing down to the given low speed value, a first set signal is connected to the delay circuit, which in turn produces a delayed output, after a given first delay time, so that the brakes are actuated and hold the vehicle. There is further provided a switch which may be a seat switch which goes active if the driver leaves his seat, and sets a second delay circuit; the latter goes active after a two-second delay has elapsed. The second delay bridges any bouncing of the driver in his seat, and serves also to stop the vehicle in case the driver should be thrown from his seat for any reason.

9 Claims, 4 Drawing Sheets

VEHICLE CREEP CONTROL

This is a Continuation-In-Part of application Ser. No. 07/184,413, filed 04/21/88, now abandoned.

The invention relates to automatic vehicle controls and more particularly to a creep control for holding a vehicle stationary after a driver has actuated the vehicle's normal driving brakes.

BACKGROUND OF THE INVENTION

In operation motor vehicles, it often happens that a driver will inadvertently lessen the pressure on the brake pedal necessary to hold the vehicle stationary or the driver's foot will accidentally slip off the brake pedal. Under such circumstances the vehicle will continue forward without control and accidents can happen therefrom.

PRIOR ART

Earlier patents have disclosed various forms of creep controls for motor vehicles. U.S. Pat. No. 4,446,950 discloses a brake control apparatus wherein a hydraulic valve is connected into the vehicle's brake lines and is controlled by a speed sensor, such that if the vehicle speed drops below a certain value with the accelerator pedal released, the hydraulic valve closes and any pressure applied by the driver to operate and hold the brakes is retained. That system, however, has the drawbacks that the system requires intervention into the vehicle hydraulic brake system and may impair the integrity of the brake system as provided by the original vehicle manufacturer and the pressure applied to stop the vehicle may not be enough to hold the vehicle stationary, and is not compatable with any of the new A.B.S. Brake System.

Another system, according to U.S. Pat. No. 4,289,219, also includes a valve in the brake lines, a speed sensor and an accelerator pedal switch connected via an electronic control to prevent the vehicle from creeping.

The creep control systems according to the prior art have various drawbacks. In particular, the creep control sensor has the drawback that whenever the vehicle is moving slowly forward in traffic, the creep control will cut in and stop the vehicle, unless the accelerator pedal is continuously kept slightly depressed. Another drawback presents itself if, for whatever reasong, additional weight is added to the vehicle (such as passenger or luggage) over the threshold pressure already applied to hold the vehicle stationary and it is parked on a slope. In that case, the vehicle could begin to move again which could be very dangerous. This above prior art also invades the integrity of the brake systems as provided by the original vehicle manufaturer, and is not compatible with any of vehicles equipped with the A.B.S. Brake System.

It is a principal object of the invention to overcome the drawbacks of the known creep control systems for vehicles.

It is a further object to provide a system that can be added to any existing vehicle without intervention into the vehicle's built-in brake system that is compatable with the A.B.S. Brake System, and is compact and has electronic controls that are reliable and require very little power drain from the vehicle's power system.

It is a further object of the invention to apply a predetermined amount of pressure at a pre-determined rate to the brake system every time the system is applied.

SUMMARY OF THE INVENTION

There is accordingly provided a vehicle creep control system which has: a speed transducer arrangement coupled to the vehicle's speedometer cable or the like, which provides an active output whenever the vehicle is not moving; an accelerator switch connected to the accelerator pedal, which has an active output whenever the driver's foot depresses the accelerator pedal, or even touches it lightly; a latching circuit with a set input connected to the speed transducer arrangement and a clear input connected to the accelerator switch; a first delay circuit connected to the output of the latching circuit, such that when the latching circuit is set due to the vehicle slowing down to a given low speed value or stand still, a first set signal is connected to the delay circuit, which in turn produces a delayed output, after a given first delay time, so that the brakes are actuated and hold the vehicle. There is further provided a seat switch which goes active if the driver leaves his seat, and sets a second delay circuit; the latter goes active after a second delay has elapsed. The second delay bridges any bouncing of the driver in his seat, and serves also to stop the vehicle in case the driver should be thrown from his seat or leave it for any reason.

In accordance with a further feature a brake actuator is provided which includes a three-way air valve having one input port connected to a vacuum source, another input port connected to an atmospheric air input and an output port connected to a brake actuator. The brake actuator includes a housing divided by a diaphragm into a front chamber connected to the air valve output port, and a rear chamber, through which a mechanical linkage is connecting the diphragm with the brake pedal.

In accordance with a still further feature, the accelerator switch is a diaphragm switch adhesively attached to the face of the accelerator pedal.

Further objects and advantages of this invention will be apparent from the following detailed description of a presently preferred embodiment, which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

Figure 1:
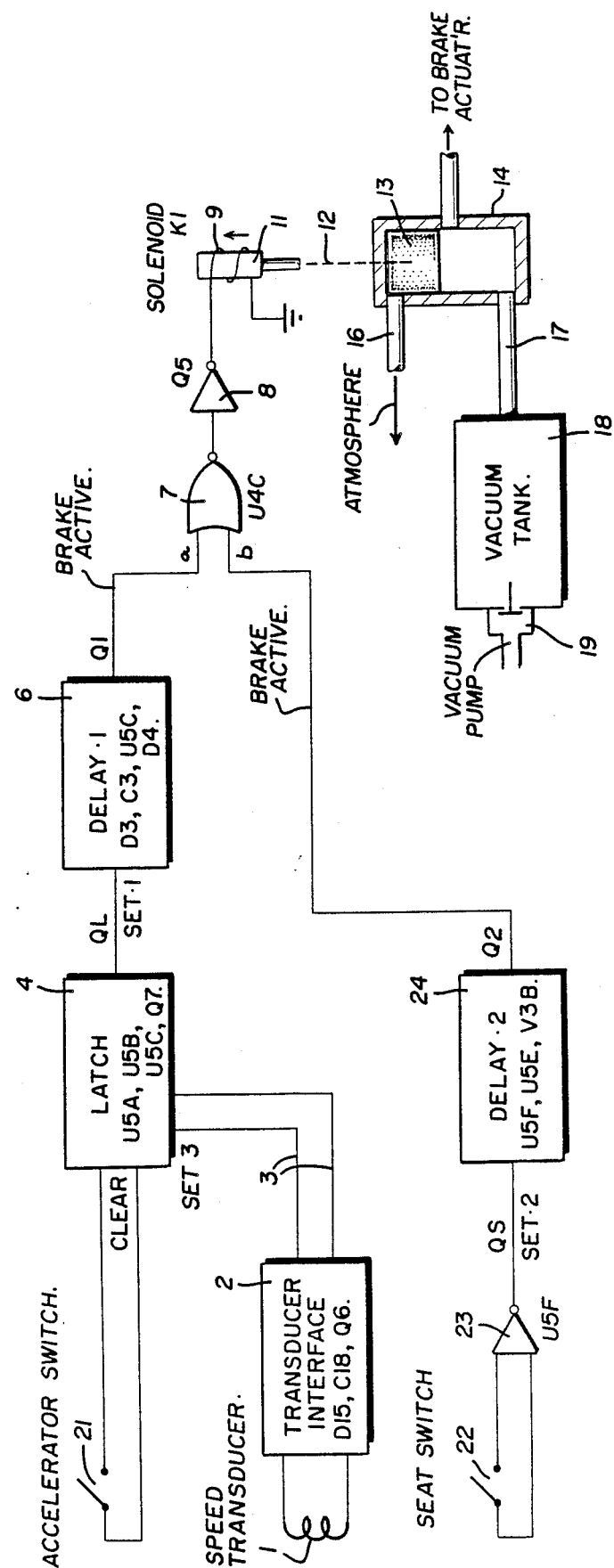
FIG. 1 is a circuit block diagram of the invention showing its major elements.

The block diagram of FIG. 1 shows speed transducer means including a magnetic pickup coil which is magnetically coupled to a ferromagnetic gearwheel coupled to the vehicle speedometer cable in well known manner. The pickup coil 1 is connected to a transducer interface 2 which includes amplifiers and rectifiers and threshold devices which produce an electric output signal 3 in the form of a logic dc-signal having an active value when the vehicle speed goes below a certain given speed, e.g. dead stop. The output signal 3 is connected to an input SET 3 of a latching circuit 4 and serves to set the latch 4 to produce an active output signal at the latch output QL, which is in turn connected to an input SET 1 of a first delay circuit 6. The delay circuit has an output Q1 which goes active after the elapse of a given delay time, e.g. 4–5 seconds after the input SET 1 has gone active. The delay output Q1 is connected via a line designated "brake active" to one input a of NOR-gate circuit 7. The NOR-gate circuit 7 has an inverted output connected to an inverting power amplifier 8 which has its output connected to a solenoid 9 having an armature 11 connected via linkage 12 to a spool 13 of a three port air valve 14, having an input port 16 connected to the atmosphere and an input port 17 connected to a conventional engine-driven vacuum pump, not shown, or the engine intake manifold, in the case of a gasoline engine.

An accelerator switch 21, in the form of a make contact, is connected to a clear input of the latch 4.

Figure 3:
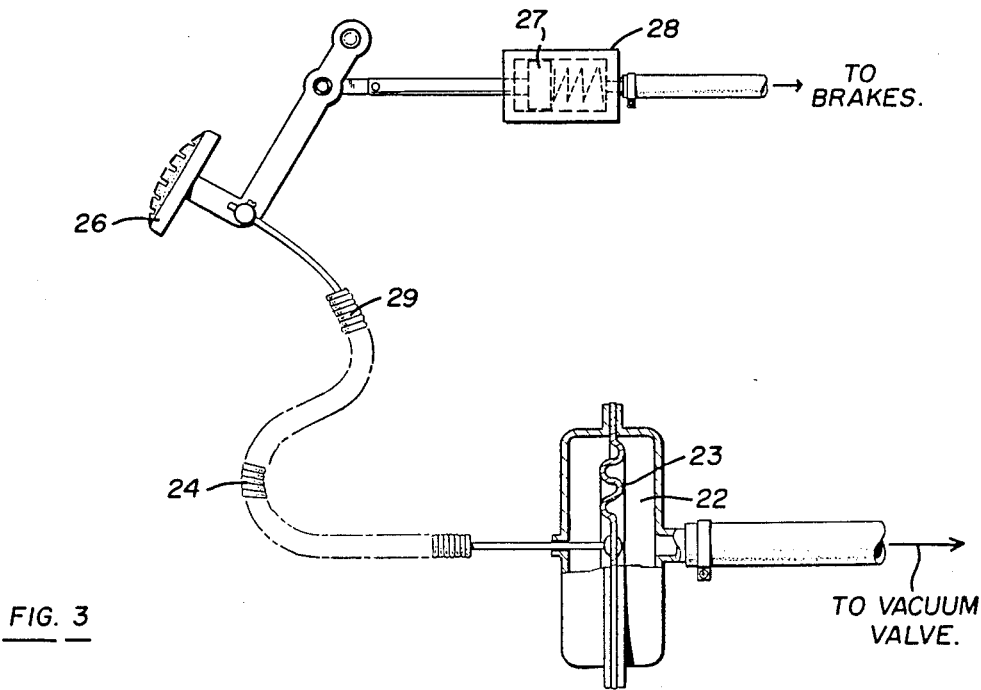
FIG. 3 is a diagrammatic view of the invention showing its mechanical parts.

In operation, as the vehicle moves and the driver begins to slow the vehicle, if the speed falls below the threshold speed or e.g. dead stop, the transducer interface circuit sets the latch 4, which activates the delay circuit 6, which in turn activates its output Q1 after a given first delay, e.g. four seconds, has elapsed. The output Q1 in turn activates the vehicle brake via NOR-gate 7, input a, the inverting amplifier 8, the solenoid 9, and the three-way air valve 14, which actuates the brakes via the brake actuator 22, seen in FIG. 3, having a diaphragm 23 connected via a Bowden cable 24, or other suitable linkage to the brake pedal 26, which in turn activates a piston 27 in the vehicle's conventional standard power booster and/or master cylinder 28 connected to the vehicle brakes.

The Bowden cable 24 may advantageously have a neck 29 which yields through the brake pedal bracket when the brake pedal 26 is operated by the driver's foot.

Figuratively speaking, the braking actuator 22 provides a mechanical "foot" that replaces the human foot when the creeping of the vehicle is to be prevented.

The presence of the delay circuit 6 has the advantage that the vehicle, when driven in slow traffic does not have its brakes activated immediately every time the vehicle speed drifts below the set speed limit, but activates only if the speed remains below the set limit for the given delay of e.g. four seconds, which will normally be the case when the driver intends to maintain the vehicle stopped.

After the vehicle has come to a full stop, for example at a traffic light, when the driver intends to move again, he engages the accelerator pedal and activates the accelerator switch 21, which clears the latch 4, causing the output QL to immediately go inactive, in turn immediately resetting the delay circuit 6, causing the brakes to be released.

In case the driver leaves the seat after slowing down the vehicle but before it has come to a complete stop or before the four second delay has elapsed, an output of the seat switch 22, which is typically a normally open switch, will become active and activate an inverting amplifier 23, which in turn applies from its output QS a signal SET 2 to a second delay circuit 24, having a delay time of typically two seconds, which serves to prevent the seat switch 22 to cut in and out whenever the driver is bounced in his seat, for example, due to a bump in the road. The output Q2 of the delay circuit 24 is connected, via a second line designated "brake active" to a second input b of the NOR-gate 7 which in turn activates the brake as described hereinabove.

Figure 2:
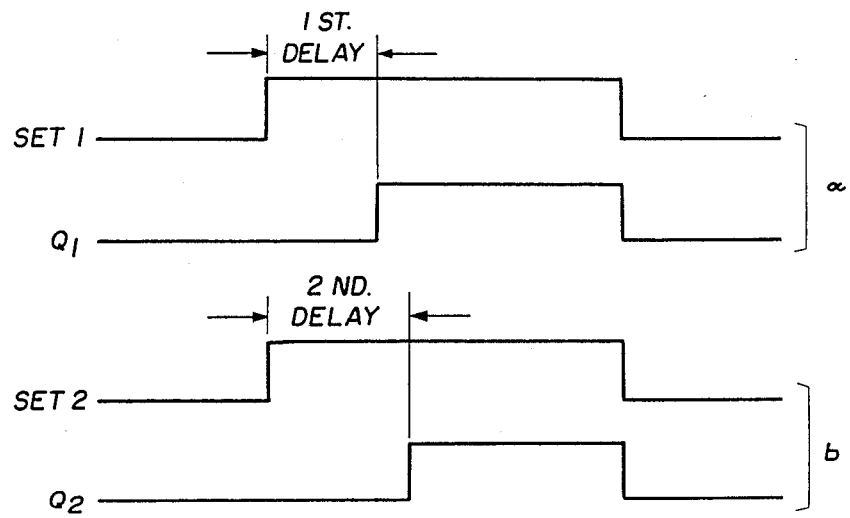
FIG. 2 is a timing diagram showing the operation of the delay circuits.

FIGS. 2a and b show the operation of the two delay circuits 6 and 24. As seen in both circuits, the output Q1,Q2 goes active (e.g. "high") after the respective delay times, delay 1, delay 2, have elapsed after the input SET 1, SET 2 has gone active. Both outputs, however, go inactive the moment the respective input SET 1, SET 2 goes inactive (e.g. "low").

Figure 4:
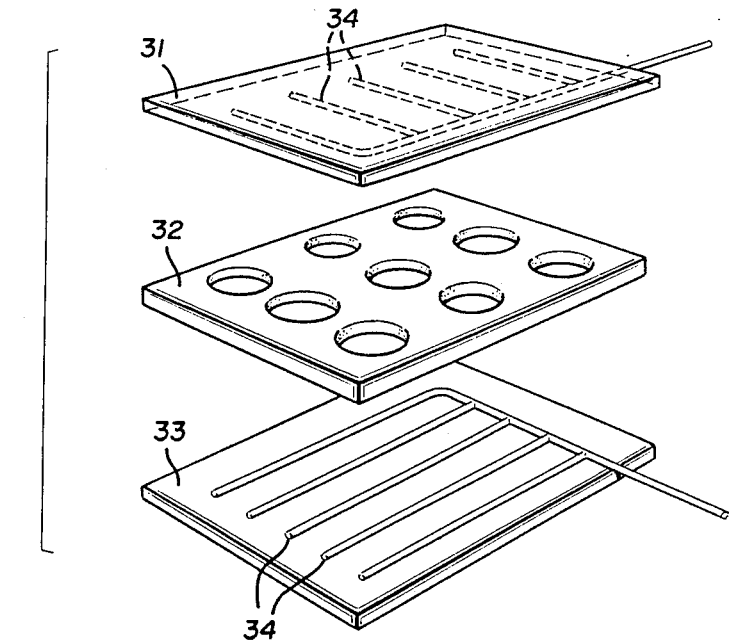
FIG. 4 is a diagrammatic exploded perspective view of the accelerator switch.
Figure 5:
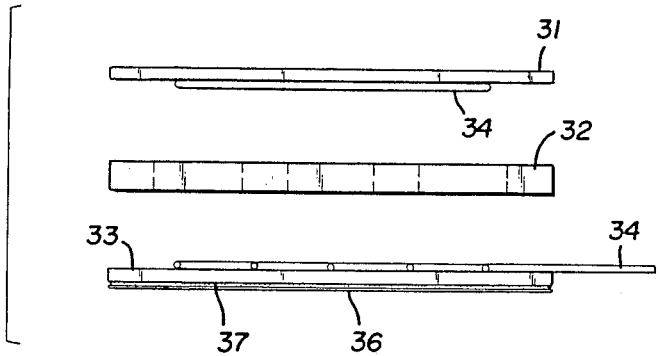
FIG. 5 is a diagrammatic cross-sectional exploded view of the accelerator switch.

FIG. 4 shows details of the accelerator switch 22, which includes two flexible diaphragms 31, 33 having metallized wiring 34 deposited on the facing surfaces of the diaphragms, in the form of two orthogonal grids, separated by an elastomeric perforated plate 32, wherein the two diaphragms 31 and 33 are to be bonded to the separating plate 32. FIG. 5 shows the assembly in an exploded view, and one of the diaphrams, e.g. 33, having a bonding layer 37 with a peel-off sheet 36 for attaching the assembled switch to the face of an accelerator pedal. The accelerator switch 22 may advantageously be an integral part of the accelerator pedal structure, rather than adhesively attached to the face of an original conventional accelerator pedal.

Figure 6:
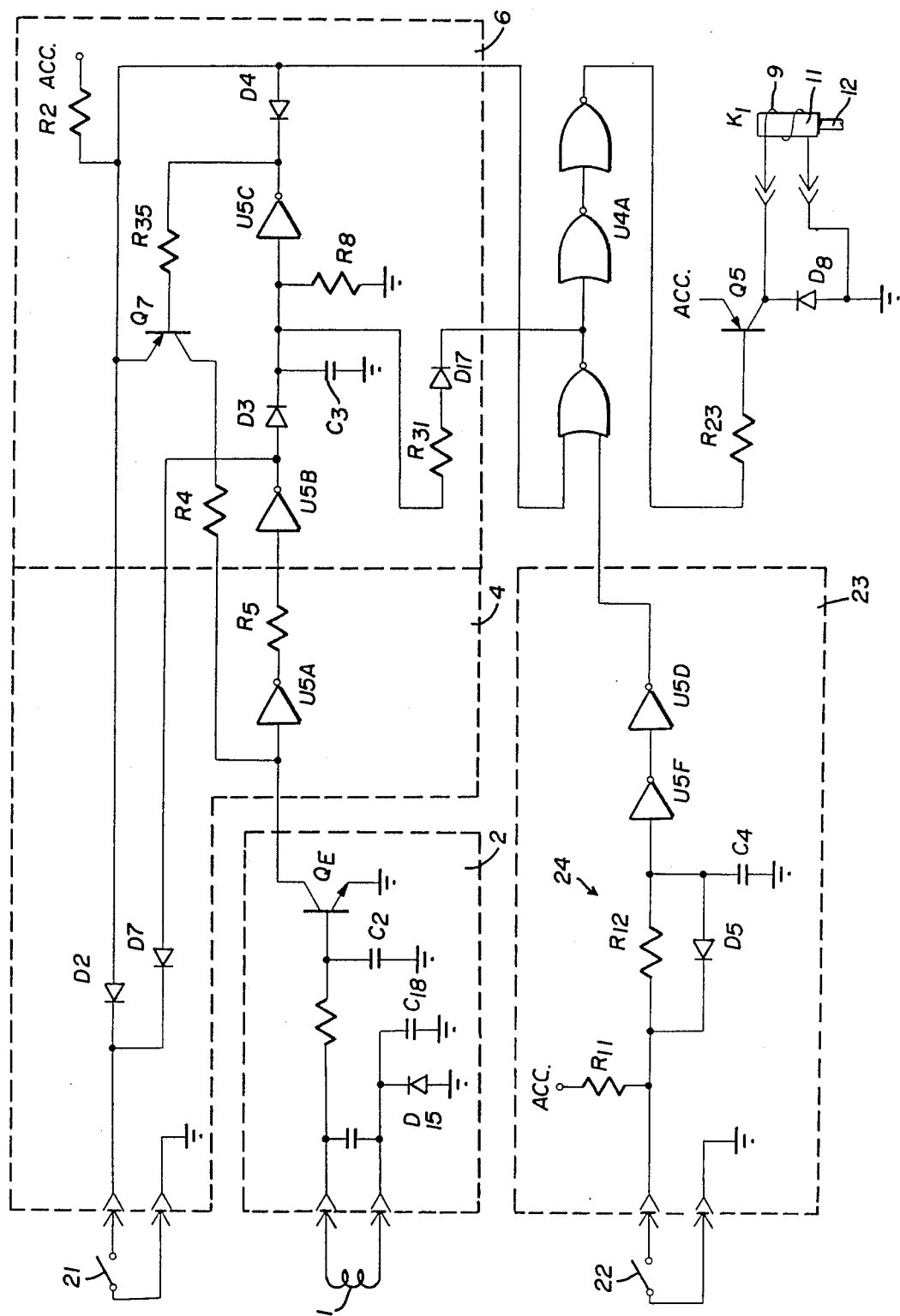
FIG. 6 is a circuit diagram of the invention, showing the electronic control circuit.

FIG. 6 is a more detailed circuit diagram of the block diagram FIG. 1. The more significant components of FIG. 6 have been shown by their designation in the various blocks of FIG. 1, so that the two diagrams can be readily correlated. Conventional details such as power distribution fuses and the like hsve been left out in FIG. 6 for the sake of clarity.

In FIG. 6, the transducer interface 2 includes a rectifier diode D15 with a storage capacitor C18 connected to one side of the transducer 1, with the other side connected to the base of transistor Q6. At speeds below the threshold level the transistor Q6 goes open with its collector at high, i.e. active potential. The output of inverter U5A goes low, and the output of inverter U5B goes high, sending a high signal through resistor R39 and diode D17 through NOR-gates U4A,U4C, which turns on transistor Q5, causing solenoid K1 to operate its armature 11, as seen in FIG. 1, applying vacuum from the vacuum tank 18 or other convenient vacuum source to the brake actuator 22, actuating the brakes. The capacitor C3 and resistor R8,R39 form a delay of approximately 4 seconds. The high potential from the output of inverter U5B is also connected to the input of inverter U5C, whose output goes low, turning on transistor Q7, the collector of which feeds back a high to the input of inverter U5A, maintaining the circuit consisting of U5A,U5B,D3,U5C and Q7 in latched condition. the latched condition remains in effects until the accelerator switch 21 is momentarily operated, which bleeds off the high at the output of inverter U5B, via diode D7 to ground, which causes the latch to be cleared, which in turn deactivates the brakes.

The seat switch 22 is connected to the input of interface circuit 23 and includes the inverters U5F and U5D, and further includes the delay circuit 24 composed of capacitor C4, resistors R11,R12 and diode D5. As shown the delay circuit 24 and the amplifier-inverter 23 are combined into a common circuit 23,24.

The NOR-gate circuit 7 is composed of three individual NOR-gates U4B, U4A and U4C, of which the latter has an output driving the base of transisitor Q5, which forms the power amplifier 8 driving the solenoid 11,12, as described above in connection with FIGS. 1 and 3.

We claim:

1. A creep control system for a vehicle having a driver's seat, a standard vehicle brake with a brake pedal, and an accelerator pedal, said creep control system comprising: a speed transducer providing an active output when the vehicle is not moving; an accelerator switch having an active output when said accelerator pedal is operated; a latching circuit having an output, a set input connected to said transducer output and a clear input connected to said accelerator switch; a first delay circuit having an input connected to the output of said latching circuit for delaying the output signal of said latching circuit for a first delay interval after said transducer output has become active, said first delay circuit having an output; and brake activating means connected to said output of said first delay circuit to respond to said output signal of said latching circuit after said delay interval, said brake activating means being connected to said brake pedal for activating said vehicle brake in response to said delayed output signal of said latching circuit; said latching circuit being responsive to an active output from said accelerator switch to terminate said brake-activating output signal from the latching circuit.

2. A creep control system for a vehicle according to claim 1, including seat switch means having an output going active when said seat is not occupied; and a second delay circuit having an input connected to said seat switch means and an output going active at the end of a second delay interval after said seat switch means goes active; said brake activating means being responsive to said second delay circuit output going active for braking the vehicle.

3. A vehicle creep control according to claim 2 wherein said brake activating means include at least a first and a second brake activating input respectively connected to said first and second delay circuit outputs, said brake activating means going active when at least one of said brake activating inputs is active.

4. A vehicle creep control according to claim 2 wherein said seat swicth means includes a set of normally open switch contacts disposed in the driver's seat, which close when the driver enters the driver's seat.

5. A vehicle creep control according to claim 1 wherein said accelerator switch is a diaphragm switch adhesively attached to the facr of the accelerator pedal.

6. A vehicle creep control system according to claim 1 wherein said accelerator switch is integral with said accelerator pedal.

7. A vehicle creep control according to claim 1 wherein said speed transducer means is coupled to a speedometer cable to detect vehicle movement.

8. A vehicle creep control according to claim 1 wherein said vehicle brake activating means includes: a three-way air valve having a solenoid connected to said brake activating means, an atmospheric air input port, a vacuum input port and an output port; a brake actuator having an input port connected to the air valve output port, and linkage means connected to the brake pedal, and said brake actuator includes a housing, a diaphragm dividing the housing into a front chamber connected to the air valve output port and a rear chamber; and said linkage means connects the diaphragm through the rear chamber with the brake pedal.

9. A vehicle creep control according to claim 8 wherein said vacuum source is at least one of an engine intake monifold and an engine driven vacuum pump.

* * * * *